United States Patent [19]

Kanazawa et al.

[11] 3,988,131

[45] Oct. 26, 1976

[54] ELECTRONIC AIR CLEANER

[75] Inventors: Hikaru Kanazawa, Tokyo; Katsuyuki Takenoshita, Fussa, both of Japan

[73] Assignees: Alpha Denshi Kabushiki Kaisha; Hitachi Jidoshabuhinhanbai Kabushiki Kaisha, both of Japan

[22] Filed: Nov. 14, 1975

[21] Appl. No.: 632,078

[30] Foreign Application Priority Data
July 9, 1975 Japan............................ 50-95505[U]

[52] U.S. Cl.................................. 55/126; 55/138; 55/143; 55/151; 55/154
[51] Int. Cl.²............................................. B03C 3/01
[58] Field of Search.............................. 55/124–126, 55/136–138, 139, 142–145, 151, 152, 154, 316

[56] References Cited
UNITED STATES PATENTS

| | | | |
|---|---|---|---|
| 2,709,954 | 6/1955 | Baker.................................. | 55/126 |
| 3,778,970 | 12/1973 | Swimmer et al...................... | 55/126 |
| 3,849,090 | 11/1974 | Remick................................ | 55/138 |

FOREIGN PATENTS OR APPLICATIONS

| | | | |
|---|---|---|---|
| 2,028,153 | 10/1971 | Germany.............................. | 55/126 |
| 931,625 | 7/1963 | United Kingdom.................... | 55/126 |

*Primary Examiner*—Bernard Nozick
*Attorney, Agent, or Firm*—Robert E. Burns; Emmanuel J. Lobato; Bruce L. Adams

[57] ABSTRACT

An electronic air cleaner, in which an air inlet, a mechanical prefilter, an electrifying cell, an electrostatic collector cell, a chemical filter and an air outlet are arranged in the order in a casing of insulating material. The electrifying cell comprises a grounded conductive protection net located behind the mechanical prefilter, a plurality of thin-wire electrodes and a plurality of grounded conductive plates. The thin-wire electrodes are less than 50 microns in diameter and arranged in appropriate intervals at substantial rectangles with an air path from the air inlet to the air outlet. Each of the grounded conductive plates has one end attached to the protection net and backwardly extending between adjacent two of the thin-wire electrodes along the air path. The electrostatic collector cell comprises the entending parts of the grounded conductive plates and a plurality of negative high voltage conductive plates respectively connected to the thin-wire electrodes and laid between the grounded conductive plates. A direct current voltage less than 4.2 kilo-volts is applied to the negative high voltage conductive plates. An electric fan causes a flow of air from the inlet to the outlet to perform highly effective air cleaning under preventing the ozone development.

10 Claims, 9 Drawing Figures

ELECTRONIC AIR CLEANER

FIELD OF THE INVENTION

This invention relates to an improved electronic air cleaner, and more particularly to a cleaner utilizing dut electrification phenomenon caused by electric discharge.

BRIEF DESCRIPTION OF THE PRIOR ART

There have been heretofore well known electronic air cleaners, or dust arrestors, each comprising a cell for electrifying the dust particles by electric discharge, and a cell for collecting the electrified particles. These dust arrestors may be operated either with a positive or negative supply voltage, and the arrestor with a negative voltage has 1.5 to 2 times better efficiency than that with a positive voltage if the absolute values of those discharge voltages are equal to each other, although the ozone generated by the former is thrice as much as that by the latter. This is the reason why such an air cleaner as required to avoid the generation of ozone for the sake of environmental sanitation employs a positive discharge voltage at the sacrifice of the efficiency, while the negative voltage discharge is often applied to the smoke eliminators where an importance is mainly placed to the dust collecting efficiency.

The discharge electrodes in the discharge cell are usually wires of 100 microns or more in diameter for the mechanical rigidity. The wires of this thickness need a positive supply voltage of at least 10 kilovolts to discharge sufficient electricity so as to obtain the desired efficiency.

Moreover, about all the charged dust particles must be collected to enhance the dust collecting efficiency. As is described above, the dust particles charged at a positive or a negative potential in the charger cell are attracted to the grounded electrode in the collector cell. The electrode must be so constructed as not to disturb the flow of air in the collector cell. For that end, the collectors electrode is usually an assembly of parallel metalic plates laminated at appropriate spaces for the flow of air.

In the collector electrodes of known structures, the dust particles arrested at the collector electrodes have the same potential as that of the electrodes, and therefore those electrodes have such defect as to allow a part of the arrested dust to disperse again into the air when exceeding their retentive capacities. To prevent dust dispersion and retain the collected dust at the electrodes, it has been proposed that oil is applied to the surface of the collector electrodes. In that case, periodic cleaning of the collector electrodes is required to avoid the clog that may increase the pressure loss against the air so as to maintain a good dust collection performance. Furthermore, the above mentioned cleaning work needs a plenty of manpower and a cleaning apparatus — e.g., an ultrasonic washer —, requiring an increased cost for it. The requirement for that work could be easily understood from a fact that there are now some independent companies doing that work.

BRIEF SUMMARY OF THE INVENTION

Accordingly, an object of the present invention is to provide a highly effective electronic air cleaner capable of providing sufficient discharge and preventing the ozone development, at a relatively low negative discharge voltage.

Another object of the invention is to provide a highly effective electronic air cleaner, comprising a mechanical after-filter or a honeycomb type filter as well as an electrostatic collector electrode for collecting the charged dust particles.

Still another object of the invention is to provide a highly effective electronic air cleaner having electrostatic collector electrodes which can be easily renewed and cleaned with a little expense.

Further object of the invention is to provide a small and light electronic air cleaner equipped with light and easily replaceable electrostatic collector electrodes having a high dust collection efficiency and suitable for motor vehicle application.

According to a feature of this invention, the above said discharge voltage is set at a negative value less than 4.2 kilovolts, and the diameter of the thin wire which serves as the discharge electrode is less than 50 microns. The reasons for that are as follows:

1. The rate of ozone generation can be decreased with a decreasing discharge voltage, regardless of the polarity of the supply voltage. That is, the ozone generation can be almost suppressed at an negative voltage of about 4.2 kilovolts or less.

2. The thin wire forming a discharge electrode in the discharger cell can discharge enough electricity and give the dust enough electric charge for the desired dust arresting performance at a relatively lower discharge voltage, and therefore the dust collection efficiency is improved.

Moreover, the electronic air cleaner of this invention will further be improved in a dust collecting efficiency by adding such collector cell as mechanical after-filter or a honeycomb component part after the electrostatic collector electrode. The honeycomb structure, having sufficient mechanical strength by itself, needs no other reinforcing members, and hence it can be small in size and light in weight, facilitating the manufacture and handling.

BRIEF DESCRIPTION OF THE DRAWINGS

The principle, construction and operation of the present invention will be clearly understood from the following description taken in conjunction of the accompanying drawings, in which.

DETAILED DESCRIPTION OF THE INVENTION

Figure 1:
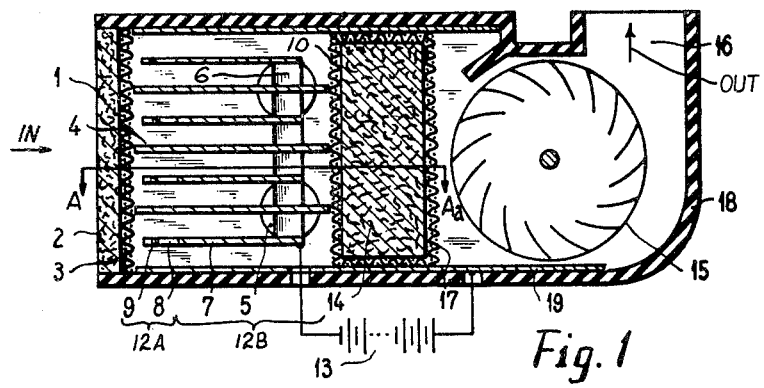
FIG. 1 shows a longitudinal section of an embodiment of the present invention.
Figure 2:
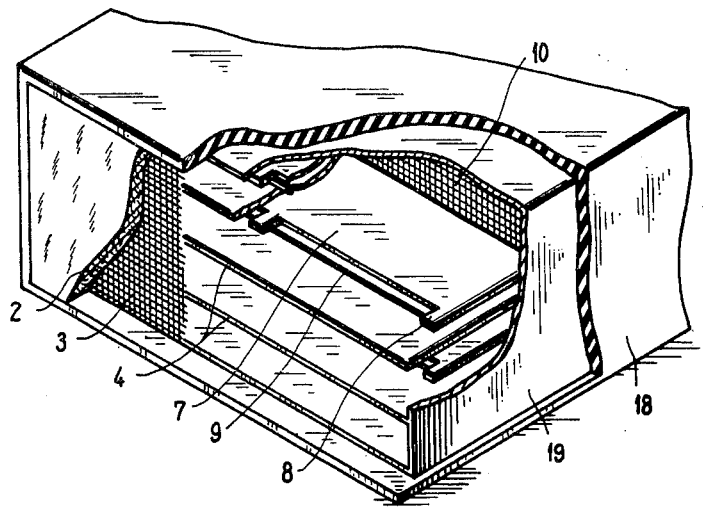
FIG. 2 is a perspective view including a cut-out part of charger and collector cells employed in this invention.
Figure 3:
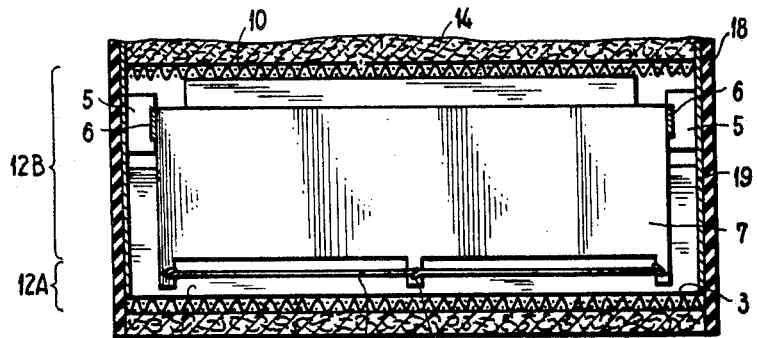
FIG. 3 shows a part of a horizontal section along a line A-Aa in FIG. 1.
Figure 4A:
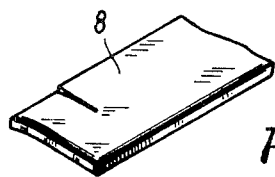
FIGS. 4A and 4B are perspective views explanatory of fixing a thin wire of discharge electrode in this invention.
Figure 4B:
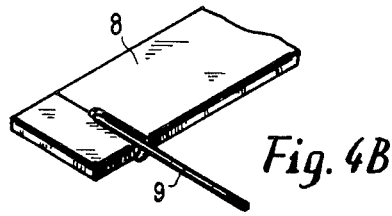

FIGS. 1 to 4 show an embodiment of the present invention. A casing 18 of insulating material has an air inlet 1, at which a pre-flter 2 pre-filter provided for removing coarse particles. At the rear side of the filter 3, is provided a protection net 3 held at the ground potential. Grounded electrode 4 each consisting of conductor plates extending from the protection net 3 to the inner part are connected to and each supported by conductors 19 and arranged between high negative voltage plate electrodes 7 supported by insulators 5 and jointly connected by conductors 6. Each high negative voltage plate electrode 7 has projections 8 forwardly extending to form an E-shaped plate. A thin-wire electrode 9 is supported at the top of the projections 8. Thus, the thin wire 9 is positioned at right angles to the flow of air. The protection net 3, the grounded electrodes 4 and the thin-wire discharge electrodes 9 form a discharge cell (i.e., a dust electrifying cell) 12A, and the grounded electrodes 4 and high-voltage negative electrodes 7 form a collector cell 12B, which attracts the charged dust particles. In a case where the thin wire 9 has a thickness of 50 microns or less, it causes a sufficient amount of negative-voltage discharge under minimum ozone generation. In a preferred embodiment of this invention, the thin-wire discharge electrode 9 is strained between the wire holders 8 of the negative high voltage plate electrode 7 in accordance with the following procedure (shown in FIG. 4) in which an end of each wire holder 8 is partially sheared and its incision edges are rounded as shown in FIG. 4A; a thin wire 9 is wrapped around the remainder part, and then the sheared part is put back in its former position to fixtedly support the wire as shown in FIG. 4B. This makes it sure to avoid such accident as the thin wire discharge electrode 9 is disconnected during the installation work. Another protection net 10 is placed behind the grounded electrodes 4, if necessary, and is kept at the ground potential. The high voltage power source 13 has a negative electrode connected to the electrodes 7 and 9, and a positive electrode connected to the electrode 19 which is placed inside the casing 18 and held at the ground potential. A chemical filter 14 placed at the rear of the protection net 10 contains activated charcoal or catalyzer for removing harmful substances. An electric cross flow fan 15 is provided to take in the polluted air from the air inlet 1 and let out the cleaned air to an air outlet 16. If necessary, a protection net 17 is attached around the chemical filter 14.

In operation, the high voltage power source 13 supplies a negative voltage to the discharge electrodes 9 causing discharge in the discharge cell 12A. The fan 15 serves to take in the polluted air from the air inlet 1. The air loses coarse dust particles when passing through the mechanical prefilter 2. The remaining fine particles having passed the filter 2 are negatively charged at the electrifying cell 12A on the principle of 'electrostatic dust collection'. Those particles are attracted to the grounded electrodes 4 in the collector cell 12B and arrested thereupon. When the air finally passes the chemical filter 14, the finer dust particles, smell; and other harmful remainders are eliminated. The air, thus cleaned, is sent out from the air outlet 16.

The electronic air cleaner according to the present invention generates ozone only at 0.01 ppm rate under a discharge voltage of −4 kilovolts. As the discharge voltage used is low, the insulation against the high voltage is easy so that the power source and other parts supplied with high voltages can be made small and light. As the electronic air cleaner in accordance with the present invention uses a negative voltage, the discharge power source can also be commonly used as the power source of negative ion generator usually provided in an electronic air cleaner of this kind. This means a fact that the entire structure can be constructed in a small and compact size. A conventional electronic air cleaner, employing a positive voltage discharge power source, needs to provide either another negative power source for that negative ion generation or a power supplying circuit with special device to make the positive power source available for the negative ion generation.

In accordance with this invention, the discharging phenomenon is easy to occur at a lower voltage, because each discharge electrodes 9 is surrounded by the upper and the lower plate electrodes 4 and the grounded protection net 3 laid across the front ends of the electrodes 9. Thus, the structure described above has the advantage of making it easy to electrify the dust particles. As the thin-wire discharge electrode 9 is covered by the plate electrodes 4 and the protection net 3, it is mechanically protected against disconnection by accidental touch during an inspection work. Besides, the electrodes 4 and the net 3 do not cause any electric shock to an inspector as they are at the ground potential.

Figure 5:
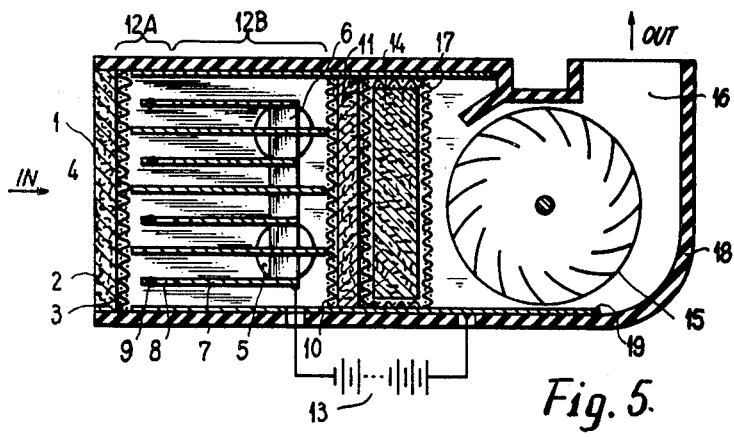
FIG. 5 shows a longitudinal section of another embodiment of the present invention.

FIG. 5 shows another embodiment of the present invention. The constitution of this embodiment differs from that of the first embodiment at the point that a mechanical after-filter 11 is inserted between the electrostatic collector cell 12B and the chemical filter 14. In FIG. 5, the same parts as those of the first embodiment are given the same reference numerals. The dust particles are attracted each other and become coarse particles when passing through the discharge cell 12A, and therefore according to this embodiment the dust particles having passed through the collector cell 12B are arrested at the mechanical after-filter 11. That means the dust collection efficiency is improved.

Figure 6:
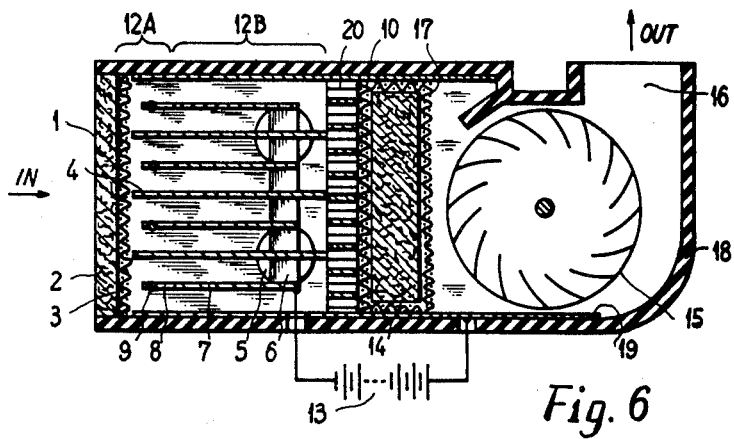
FIG. 6 shows a longitudinal section of another embodiment of this invention.
Figure 7:
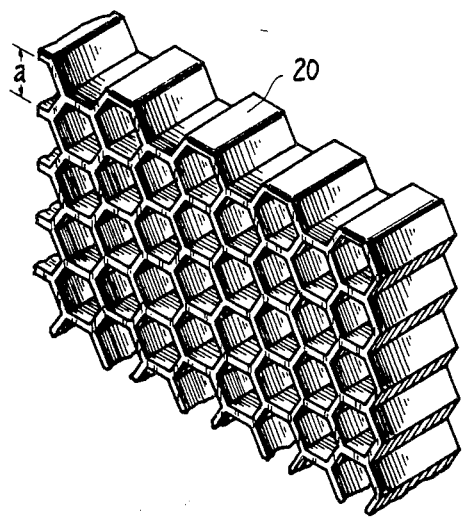
FIG. 7 is a perspective view of the honeycomb structure of the embodiment shown in FIG. 6.

FIG. 6 shows another embodiment of this invention. In this embodiment, a honeycomb type collector electrode 20 is placed between the chemical filter 14 and the electrostatic collector cell 12B. In FIG. 6, the same parts as those of the first embodiment are marked with the same reference numerals. The honeycomb electrode 20, being at the ground potential, serves to improve the dust collection efficiency, because it collects in an electrostatic way the charged particles that were not caught at the electrostatic collector cell 12B. The honeycomb collector electrode 20 may be made of aluminum (e.g., a thickness of 0.05 mm) or other metal sheets, metalized papers, or conductive plastics, and is preferbly a combination of hexgonal cylinders as shown in FIG. 7. The cell size $a$ (FIG. 7) may be chosen at an appropriate value. The honeycomb type collector electrode 20 employed in this invention can be produced only by cutting in a desired size the honeycomb component part being on sale under the TRADE name "ALUMI-HONEYCOMB". Since such a part made of very light aluminum with a space factor of only about three percent has the sufficient mechanical rigidity by itself and does not need any special frame or reinforcement, reducing the weight and cost, it is suitable for the application to the vehicles, e.g. airplanes and cars, under a low weight and cost. In addition, it may be thrown away after use. Furthermore, the honeycomb collector electrode 20 is easily replaced by a new one, cleaned, or removed, when constructed in a cartridge form.

Figure 8:
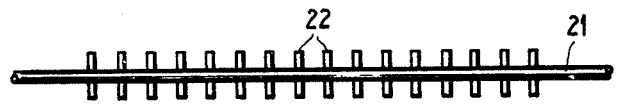
FIG. 8 is an elevational view of another example of the thin-wire discharge electrode in this invention.

The discharge electrode 9 may have such structure as shown in FIG. 8. The discharge electrode of FIG. 8 has a number of short and fine discharge wires 22 (those wires are no more than 50 microns in thickness) fixed in a crosswise form at appropriate intervals on a relatively long and thick conductive support wire 21, which is strained between the wire holder 8 of the negative high voltage plate 7. This structure can be produced by welding, studding or some other process.

Under this structure, since the discharge fine wires 22 can be minimized in thickness, the mechanical strength of the discharge electrode can be improved by the support wire 21 while producing sufficient discharge at a lower voltage.

What we claim is:

1. An electronic air cleaner, comprising:
   a casing of insulating material having an air inlet and an air outlet;
   a mechanical pre-filter placed in said casing at the air inlet;
   a grounded conductive protection net located in said casing behind said mechanical pre-filter;
   a plurality of thin-wire electrodes less than 50 microns in diameter arranged in appropriate intervals at substantial rectangles with an air path from the air inlet to the air outlet;
   a plurality of grounded conductive plates each having one end attached to said protection net and backwardly extending, between adjacent two of said thin-wire electrodes, along said air path, said thin wire electrodes forming a discharge cell together with said protection net and said grounded plates;
   an electrostatic collector cell including said extending parts of said grounded conductive plates and a plurality of negative high voltage conductive plates respectively connected to said thin-wire electrodes and laid between said grounded conductive plates;
   a chemical filter placed in said casing behind said electrostatic collector cell;
   an electric fan seated in said casing to cause a flow of air from said air inlet to said air outlet; and
   a negative direct-current high voltage power source of less than 4.2 kilo-volts connected across the ground and said high negative voltage conductive plates.

2. An electronic air cleaner according to claim 1, in which each of said thin-wire discharge electrodes comprises a conductive support wire, strained through forwardly extended projections of said negative high voltage plates, and a number of fine wires fixed on the support wire at appropriate intervals at substantial rectangles with said air path.

3. An electronic air cleaner according to claim 1, in which each of said thin-wire discharge electrodes is strained through forwardly extended projections of said negative high voltage plates.

4. An electronic air cleaner according to claim 2, in which said thin-wire discharge electrodes are each wrapped around at the sheared gaps provided at the projections.

5. An electronic air cleaner according to claim 1, further including a mechanical after-filter provided between said electrostatic collector cell and said chemical filter.

6. An electronic air cleaner according to claim 5, in which each of said thin-wire discharge electrodes is strained through forwardly extended projections of said negative high voltage plates.

7. An electronic air cleaner according to claim 5, in which each of said thin-wire discharge electrodes comprises a conductive support wire, strained through forwardly extended projections of said negative high voltage plates, and a number of fine wires fixed on the support wire at appropriate intervals at substantial rectangles with said air path.

8. An electronic air cleaner according to claim 1, further includng a honeycomb type electrostatic collector electrodes placed between said electrostatic collector cell and said chemical filter.

9. An electronic air cleaner according to claim 8, in which each of said thin-wire discharge electrodes is strained through forwardly extended projections of said negative high voltage plates.

10. An electronic air cleaner according to claim 8, in which each of said thin-wire discharge electrodes comprises a conductive support wire, strained through forwardly extended projections of said negative high voltage plates, and a number of fine wires fixed on the support wire at appropriate intervals at substantial rectangules with said air path.

* * * * *